(12) United States Patent
Yamamoto (10) Patent No.: US 8,069,177 B2
(45) Date of Patent: Nov. 29, 2011

(54) INFORMATION SELECTING METHOD, INFORMATION SELECTING DEVICE AND SO ON

(75) Inventor: Kentaro Yamamoto, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 1141 days.

(21) Appl. No.: 11/884,260

(22) PCT Filed: Jan. 27, 2006

(86) PCT No.: PCT/JP2006/001311
§ 371 (c)(1),
(2), (4) Date: Aug. 14, 2007

(87) PCT Pub. No.: WO2006/087891
PCT Pub. Date: Aug. 24, 2006

(65) Prior Publication Data
US 2008/0163299 A1    Jul. 3, 2008

(30) Foreign Application Priority Data

Feb. 18, 2005  (JP) .................. 2005-041826

(51) Int. Cl.
*G06F 7/00* (2006.01)
*G06F 17/30* (2006.01)

(52) U.S. Cl. ........ 707/755; 707/968; 707/972; 707/974; 725/44; 382/124

(58) Field of Classification Search ............ 707/755, 707/968, 972, 973, 974, E17.022; 725/44; 84/611, 612; 382/124
See application file for complete search history.

(56) References Cited

U.S. PATENT DOCUMENTS

| | | | |
|---|---|---|---|
| 6,320,111 B1 * | 11/2001 | Kizaki ............... | 84/609 |
| 6,910,967 B2 * | 6/2005 | Yamaguchi ......... | 715/201 |
| 7,317,158 B2 * | 1/2008 | Yamamoto .......... | 84/612 |
| 2001/0003542 A1 * | 6/2001 | Kita ................... | 381/334 |
| 2003/0187798 A1 * | 10/2003 | McKinley et al. .. | 705/50 |
| 2005/0141881 A1 * | 6/2005 | Taira et al. ......... | 386/125 |
| 2006/0107822 A1 * | 5/2006 | Bowen ............... | 84/612 |

FOREIGN PATENT DOCUMENTS

| | | |
|---|---|---|
| JP | 62-46480 A | 2/1987 |
| JP | 09-245042 A | 9/1997 |
| JP | 2004-30792 A | 1/2004 |
| WO | WO 97/33424 A2 | 9/1997 |

OTHER PUBLICATIONS

Carlos Cotta & Pablo Moscato—"EvolutionaRY Computation: Changes and Duties" —Frontiers of Evolutionary Computation, Genetic Algorithms and Evolutionary Computation, 2004, vol. 11 (pp. 53-72 or 1-20).*
Chi et al. —"Using Information Scent to Model User Information Needs and Actions on the Web" —CHI 2001—Mar. 31, 2001—Apr. 5, 2001 (pp. 490-497 or 1-8).*
Japanese Patent Office Action dated Feb. 3, 2009.

* cited by examiner

*Primary Examiner* — John E Breene
*Assistant Examiner* — Anh Ly
(74) *Attorney, Agent, or Firm* — Sughrue Mion, PLLC (57) ABSTRACT

An information selection method and an information selection apparatus are provided. The information selection method includes continuously selecting arbitrary program information out of a plurality of program information, extracting selection candidate program information to be selected after predetermined program information based on a previous selection order of the plurality of program information, and determining one of the extracted selection candidate program information as program information to be selected after the predetermined program information.

6 Claims, 5 Drawing Sheets

FIG.2

| | HAPPY SONG | HOT SONG | QUIET SONG | SAD SONG | |
|---|---|---|---|---|---|
| KEY | C MAJOR (MAJOR SYSTEM) | | | A MINOR (MINOR SYSTEM) | ...... |
| CHORD CHANGE RATE (HVL) | MIDDLE TO HIGH | HIGH | LOW | LOW TO MIDDLE | ...... |
| BEAT CHANGE AMOUNT (BPM) | MIDDLE TO HIGH | HIGH | LOW | LOW TO MIDDLE | ...... |
| BEAT MAXIMUM VALUE | MIDDLE TO HIGH | HIGH | LOW | LOW TO MIDDLE | ...... |
| AVERAGE STRENGTH OF SOUND (AVERAGE LEVEL) | MIDDLE TO HIGH | HIGH | LOW | LOW TO MIDDLE | ...... |
| ...... | ...... | ...... | ...... | ...... | ...... |

FIG.3

ID LIST

| ID | SONG TITLE |
|---|---|
| ID1 | aaaaaa |
| ID2 | bbbbbb |
| ID3 | cccccc |
| ID4 | dddddd |
| ID5 | eeeeee |
| ID6 | ffffff |
| ID7 | gggggg |
| ID8 | hhhhhh |
| ID9 | iiiiii |
| ... | ...... |

(A)

SELECTION ORDER LIST

| No. | SELECTION ORDER | SELECTION COUNT |
|---|---|---|
| No.1 | ID1→ID2→ID3→ID4 | 5 |
| No.2 | ID2→ID5→ID3 | 1 |
| No.3 | ID2→ID1→ID7→ID9 | 1 |
| No.4 | ID4→ID10→ID5→ID2 | 1 |
| No.5 | ID8→ID9→ID4→ID1 | 3 |
| No.6 | ... | ... |
| ... | ... | ... |
| ... | ... | ... |
| ... | ... | ... |
| ... | ... | ... |

DIVIDED SELECTION ORDER LIST

| No. | SELECTION ORDER | SELECTION COUNT |
|---|---|---|
| No.101 | ID1→ID2→ID34 | 5 |
| No.102 | ID2→ID3→ID4 | 5 |
| No.103 | ID2→ID5→ID3 | 1 |
| No.104 | ID2→ID1→ID7 | 1 |
| No.105 | ID1→ID7→ID9 | 1 |
| No.106 | ID4→ID10→ID5 | 1 |
| No.107 | ID10→ID5→ID2 | 1 |
| No.108 | ID8→ID9→ID4 | 3 |
| No.109 | ID9→ID4→ID1 | 3 |
| ... | ... | ... |
| ... | ... | ... |
| ... | ... | ... |
| ... | ... | ... |

INFORMATION SELECTING METHOD, INFORMATION SELECTING DEVICE AND SO ON

TECHNICAL FIELD

The present invention relates to a technical field of a selection method of program information for continuously selecting arbitrary program information out of a plurality of program information pieces, for example, song or the like.

BACKGROUND ART

Large capacity of recent recording mediums such as hard discs (HD) and recent development of data compression technique such as MPEG Audio Layer (MP3) and Adaptive Transform Coding (ATRAC 3) make it possible for a user to record and reproduce various song (music) data recorded on, for example, Compact Disc (CD), Mini Disc (MD), and Digital Versatile Disc (DVD) onto one HD or the like in use of for example audiovisual apparatus or personal computer. Further, it becomes possible to download song data from a distribution server on internet, record these on HD or the like, and reproduce these.

In selecting song to be reproduced out of many songs thus recorded, an information reproduction apparatus which has random reproduction function of selecting and reproducing one song of a track number corresponding to a random number generated with a random number generator or a shuffle reproduction function.

For example, Patent Document 1 discloses an information reproduction method of searching number of songs contained in a disc selected and selecting one of the songs using a random number to thereby reproduce it.

Patent Document 1: Japanese Unexamined Patent Publication Shou 62-46480.

DISCLOSURE OF THE INVENTION

Problems to be Solved by the Invention

However, in the random reproduction function of selecting songs for example by generating random number, there is a problem that an identical song is continuously selected. Meanwhile, it is possible to configure such that the identical song is not continuously selected. However, in such the case, a song is arbitrarily selected on a apparatus side. Therefore, there is a possibility that a song which a user does not wish to listen may be selected. Therefore, there is inconvenience that the user should cancel random reproduction function or put up with listening such the song.

Further, an order of selecting the random reproduction function and the shuffle reproduction function is not reflection of human thought, sensibility or the like. Therefore, such an order is not natural for human. Provided that it is aimed to realize song selection reflecting human cerebration and sensitivity, algorism of sophisticated artificial intelligence or the like will be necessary.

An object of the present invention is to solve such the problem. There is provided an information selection method and information selection device which enables easy selection (selection of program information such as song) in a natural manner for human being.

Means for Solving Problems

In order to solve the above problem, according to a first aspect of the present invention, there is provided a selection method of program information for selecting an arbitrary program information piece out of a plurality of program information pieces, including steps of:

extracting a selection candidate program piece selected next to a predetermined information piece on the basis of a selection order of a plurality of program information pieces selected in past times; and determining one of the selection candidate program information piece thus selected as program information piece selected next to the predetermined program information piece at a time of continuously selecting the program information piece selected next to the predetermined program information.

In order to solve the above object, according to another aspect of the present invention, there is provided an information selection apparatus for continuously selecting an arbitrary program information piece out of a plurality of program information pieces, including:

an extraction means for extracting a selection candidate program information piece which is selected next to a predetermined program information piece from a selection order of a plurality of program information pieces selected in past times; and a determination means for determining one of the selection candidate program information pieces thus selected as a program information piece selected next to the predetermined program information piece at a time of continuously selecting one of the selection candidate program information pieces thus extracted.

In order to solve the above object, according to another aspect of the present invention, the information selection apparatus and a reproduction control means for reproducing the program information pieces continuously selected with the information selection apparatus are further provided.

In order to solve the above object, according to another aspect of the present invention, there is provided a selection process program causing a computer, which continuously selects an arbitrary program information piece out of the plurality of program information pieces, function to extract a selection candidate program information piece selected next to a predetermined program information piece out of a plurality of program information pieces selected in past times, and to determine one of the selection candidate information piece thus extracted as a program information piece selected next to the predetermined program information piece at a time of the continuous selection.

In order to solve the above object, according to another aspect of the present invention, the selection process program is recorded on a recording medium in a manner readable by a computer.

BRIEF DESCRIPTION OF THE DRAWINGS

FIG. 3 (A) shows an example of content of an ID list, and (B) shows an example of content of selection order list.

DESCRIPTION OF REFERENCE NUMERALS

1: Information Reproduction and Record Apparatus
2: Song Distribution Server 3: Information Providing Server
4: Network
11: Information Reproduction Unit
12: Information Output Unit
13: Song Characteristic Amount Extraction Unit
14: Information Record and Reproduction Unit
15: Operation Display Unit
16: Microphone
17: Sound Recognition Unit
18: Communication Unit
19: System Control Unit

BEST MODES FOR CARRYING OUT THE INVENTION

Hereinafter, a best mode for carrying out the present invention will be described in reference of attached figures. The mode described below relates to a case where the present invention is applied to an information reproduction and record apparatus (information reproduction apparatus).

First, in reference of FIG. 1, structure and function of the information reproduction and record apparatus will be described.

Figure 1:
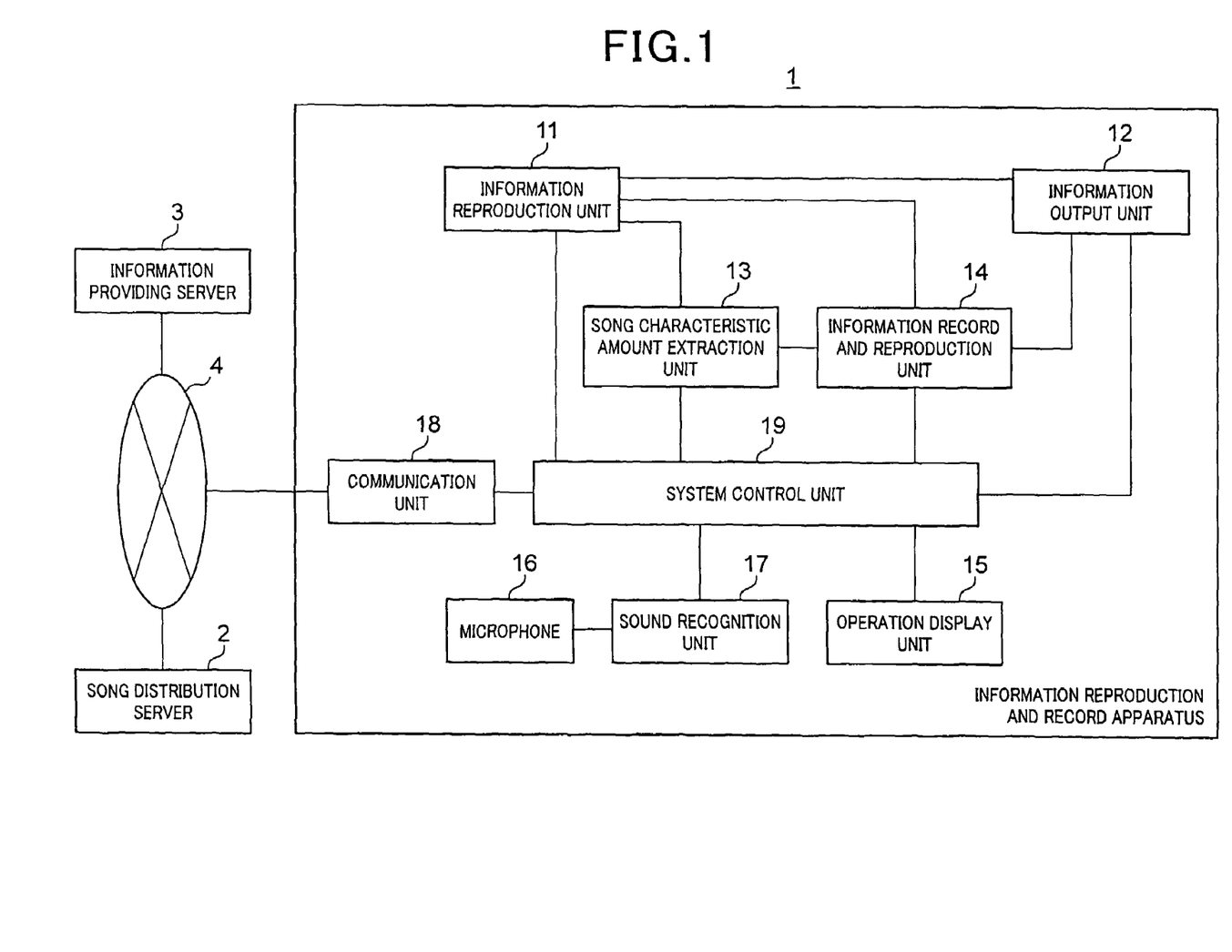
FIG. 1 A figure schematically exemplifying a block chart of an information reproduction apparatus according to the present invention.

FIG. 1 shows a schematic block example of the information reproduction and record apparatus according to this Embodiment.

As shown in FIG. 1, the information reproduction and record apparatus 1 is configured to have an information reproduction unit 11, an information output unit 12, a song characteristic amount extraction unit 13, a information record and reproduction unit 14, an operation and display unit 15, a microphone 16, a sound recognition unit 17, a communication unit 18, and a system control unit 19.

The information reproduction unit 11 reproduces a song recorded on a recording medium such as a CD (generic name of such as Compact Disc: CD-DA (Digital Audio), CD-R, and CD-R/W), MD (mini disc), DVD (generic name of such as Digital Versatile Disc: DVD-Audio, DVD-Video, DVD-R, and DVD-RW), and a card-type recording medium (e.g. memory stick and SD card), and outputs to the information output unit 12, the song characteristic amount extraction unit 13, and the information record and reproduction unit 14.

For example, in a case where the information reproduction unit 11 is provided to reproduce song recorded on a CD (e.g. CD-DA), the information reproduction unit 11 includes an optical pickup for irradiating light beam onto the CD to optically read out recorded information and outputs a read-out signal after providing photoelectric transfer thereto, an RF amplifier for generating an RF (Radio Frequency) signal or the like out of an electric signal outputted from the optical pick-up, a digital signal processing circuit (for example, constructed by DSP (Digital Signal Processor) for applying a predetermined decoding process, error correction process, and so on to the RF signal), and a servo circuit for servo-controlling a spindle motor and the optical pick-up (respectively not shown), to thereby conduct reproduction and output of the song.

Further, in a case where a recording medium has accompanying information accompanying song (for example, text information such as title and genre of the song (rock, jazz, pops, classic, hip-hop, or the like)), artist name, err (for example, information indicative of when it is produced) and so on, recorded on it (for example, the recording medium is CD-TEXT or the like), the information reproduction unit 11 reads out the accompanying information out of the recording medium and outputs it to the recorded information reproduction unit 14, under a control of the system control unit 19.

Further, because known structure and function for reproducing song out of recording mediums other than CD are applicable, detailed explanation is omitted. Further, it may be possible to construct so that songs are reproduced from a plurality of recording mediums.

The information output unit 12 includes a Digital-to-Analogue Converter (DAC) which receives song (digital sound signal) reproduced with the information reproduction unit 11, sound guide information outputted from the system control unit 19 or the like, and converts these to analogue sound signal, an amplifier (AMP) for amplifying and outputting the analogue sound signal, a speaker for outputting the analogue signal thus amplified as sound wave and soon (not shown), to thereby output songs from the speaker.

The sound characteristic amount extracting unit 13 is constituted by for example a DSP, receives a song reproduced and outputted by the information reproduction unit 11, extracts song characteristic amount indicative of characteristic of the song out of the data of the song, and outputs it to the information record and reproduction unit 14 and the system control unit 19.

Here, the song characteristic information is information quantitatively indicative of characteristics of the song (e.g. numeric values between 0 to 100). For example, music characteristic amount obtained from sound of song may be contained therein.

The music characteristic amount is for example a key (song tonality like C Major or A Minor) change position of key (or change pattern), chord (harmony or its combination), change position of key (or change pattern), change amount of chord (CPM)(or change rate (HVL)), beat (battuta: predetermined pulse signal having strong and weak), maximum value of the beat (or minimum value or average value), change position of the beat (or change pattern), change amount of beat (BPM) (or change rate), maximum strength, volume, change position of the volume (or change pattern) or the like can be mentioned.

In order to extract the song characteristic amount, it is possible to apply know various methods. Although detailed explanation is omitted, for example, the song characteristic amount extraction unit 13 analyses frequency of the song data in use of Fast Fourier Transformation (FFT) to thereby calculate volume values with respect to frequencies at predetermined time intervals along a time axis. Accordingly, a key and an amount related thereto (e.g. change position of the key) and a chord and an amount related thereto (e.g. a change position and change amount of the chord) are extracted. Further, a beat and an amount related there to (e.g. a maximum value of the beat (signal)) are extracted by detecting envelop of wave form related to the song data at a predetermined threshold level.

For example, such the song characteristic amount (hereinafter referred to as song characteristic amount) is used for discriminating musical mood of song with the system control unit 19. In processing the musical mood based on the song characteristic amount, a table for associating musical mood, which is previously set and saved, is used for stipulating association between the song characteristic amount and the musical mood.

Figure 2:
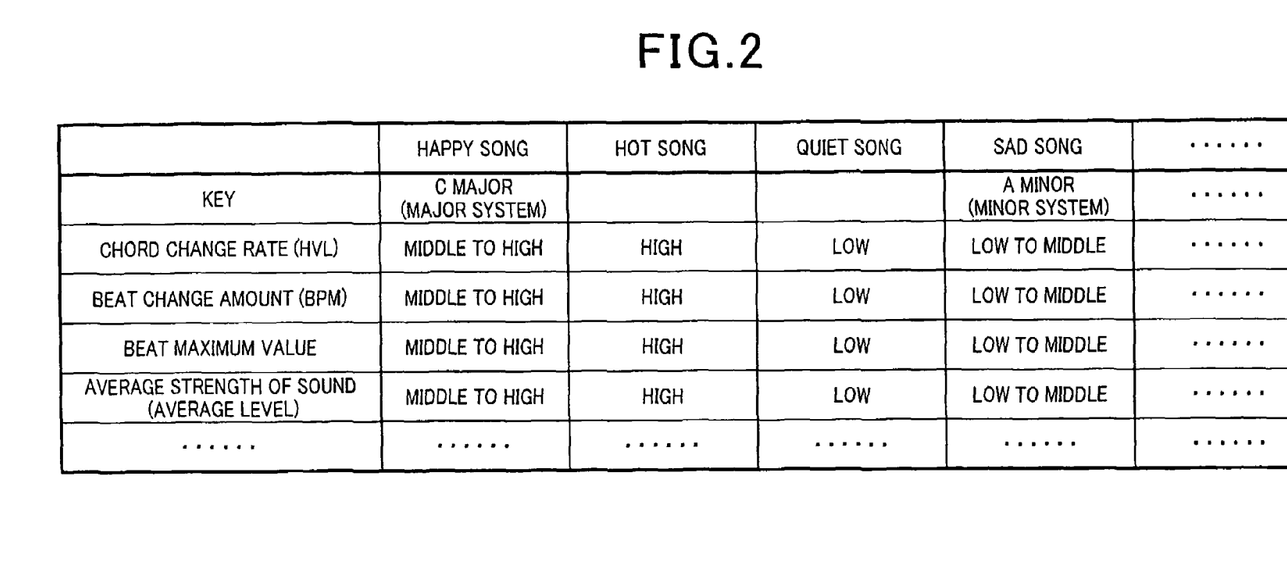
FIG. 2 A figure showing an example of a table for associating musical mood.

FIG. 2 shows an example of the table for associating the musical mood level. In the example shown in FIG. 2, "happy song", "hot song", "quiet song", and "sad song" are presented as the musical mood, and "key", "change rate of chord (HVL)", "change amount of beat (BPM)", "maximum amount of beat", and "average strength of sound (average level)" are presented.

Further, in FIG. 2, the level of song characteristic amount is indicated using "high", "middle" and "low". For example, "high" is in a numerical range of 80 to 100, "middle" is in a numerical range of 30 to 79, and "low" is in a numerical range of 0 to 29. Accordingly, "middle to high" represents a range of 30 to 100, and "low to middle" does a range of 0 to 79. Further, although C Major or A Minor is shown as an example of "key", these can be respectively represented by a certain numerical range.

In a case where such the table for associating musical mood level is referred to and the musical mood level is discriminated, it is judged for example whether or not the song characteristic amount thus specified satisfies a level of song characteristic amount corresponding to "happy song", in other words whether or not it is within a numerical range shown in FIG. 2. If it is satisfied, the song is discriminated to match "happy song". (similar discrimination is applicable to other musical mood levels)

As such, when the musical mood level is once discriminated, information indicative of the musical mood levels thus discriminated is registered in a song list described below in correspondence with the songs.

The information record reproduction unit 14 includes, for example, a buffer memory for temporally storing song data or the like, an encoder/decoder for encoding (compressing) or decoding (extending) song data, a hard disc (HD), a HD drive for recording song data or the like to the HD or reproducing the song data from the HD, and so on.

Further, the information record and reproduction unit 14 may include a recording medium such as an MD, a DVD-RW, and a card-type recording medium.

The information record and reproduction unit 14 records song data outputted from for example the information reproduction unit 11 onto the HD under control by a system control unit 19 after compressing the song data, and also records accompanying information outputted from the information reproducing unit 11 in association with the songs. Further, the information record and reproduction unit 14 is provided to record the song characteristic information outputted from the song characteristic information extraction unit 13 under control of the system control unit 19.

Further, the information record and reproduction unit 14 is provided to record song data, which are distributed from for example a song distribution server 2 through a network (for example, it is made of internet and a mobile communication network) under control by a system control unit 19 and received through the communication unit 18, and accompanying information accompanying the song data onto the HD.

Further, the song characteristic amount of a song obtained from the song distribution server 2 is extracted with the song characteristic amount extraction unit 13 and recorded in association with the song when for example obtaining the song characteristic information.

Unique registration number (e.g. serial number) is respectively allocated to songs recorded on the HD with the information record and reproduction unit 14 thereby being controlled by a list. For example, registration number, data capacity, recording site, playback time, the accompanying information, title (in a case where it is accommodated in an album) of album (e.g. CD album), a track number in a case where it is accommodated in the album (song order in the album), and administration information such as the song characteristic amount are registered in the song list. The song list data are for example recorded on the HD and appropriately read out and used by the system control unit 19.

The accompanying information accompanying songs may be inputted by a user of operating operation and display unit 15 by a user and registered in a song list as administration information. Further, the system control unit 19 reads out Table of Content (TOC) information recorded in for example an innermost portion of CD and inquires a server (not shown) having a known CDDB (CD database) using the TOC as a key through a network 4. Then the accompanying information of a song recorded in CD may be obtained from the server and registered in the song list as the administration information.

The operation and display unit 15 includes a display panel (e.g. liquid crystal display) of for example a touch panel type. The operation and display unit 15 displays administration information included in the song list, operation button of a user for inputting various instructions and so on under a control of the system control unit 19. Examples of the operation button are a replay button, a fast forward and fast rewind button, a skip (track skip) button, a song selection button (for example, a button for producing a desirable play list (a list stipulating a reproduction order of songs)), and so on. When if such the buttons are pushed, an instruction signal corresponding to the operation button is outputted to the system control unit 19. Further, it is possible to further use a remote controller having operation button provided thereon.

A microphone 16 detects (collects) sounds which relate to various instructions uttered by a user. Such the sound signal is outputted to a sound recognition unit 17. The sound characteristic amount is an information piece quantitatively indicative of characteristic of songs (which is expressed by numerals between 0 to 100). For example, the song characteristic amount obtained from the sound of song may be included may be included in the song characteristic amount.

The sound recognition unit 17 is to perform a known sound recognition process, wherein frequency of the sound signal from the microphone 16 is analyzed, and the most suitable candidate is selected out of a group of uttered sound candidate, prepared in advance. By this, information included in the sound signal (for example, indication information for selecting the songs) is recognized and outputted to the system control unit 19.

The system control unit 19 includes a CPU having an operation function, a working RAM, various processing programs (including selection processing program) and an ROM for storing data. The system control unit 19 is an example of the information selection apparatus and the reproduction control means of the present invention. Further, the selection process program may be downloaded from a predetermined server connected to a network 4, or may be read out of a recording medium, recording the selection process program, such as CD-ROM through a drive for the recording medium.

When the CPU executes the program stored in ROM or the like, the system control unit 19 totally control the information reproduction and record device 1 in its entirety whereby record of song, reproduction control or the like is carried out. Further, in a case where the system control unit 19 continuously selects an arbitrary song to be reproduced out of for example a plurality of songs (data) recorded in for example HD, a selection candidate song to be selected after a predetermined song is selected in accordance with selection order of a plurality of songs selected in the past as an extraction means, and one of the selection candidate songs thus extracted is determined as a song to be selected next to the predetermined song when being continuously selected as above as a determining means.

Here, "selection" means action (for example, operation of replay button, fast forward and fast rewind button, skip button, song selection button or the like) of designating a song (or a song title, or a track number) by human or action of designating a song by a machine based on a predetermined algorism reflecting cerebration, sensitivity or the like of human, to thereby produce a play list or reproduce songs.

Further, human (human being) is not specifically limited to a user of the apparatus 1 and may be artists of song, persons concerning club, disk jockeys (DJ) of broadcasting program such as radio program, information providers of serving music information on for example magazine and internet, and amateur providers of play list named iMix in iTunes.

Further, play list is not specifically limited to what is produced by a user of the apparatus 1. For example, it is a song selection list (namely, edit list; for example a list stipulated in an order of proposing a listener to listen) produced by an artist of song, a disk jockey in broadcasting program such as a radio broadcasting program, an editor, a publisher, the amateur, and so on. For example, the song selection list includes an artist selection (edit) song list selected or edited by an artist, a radio selection (edit) song list selected or edited by a disk jockey in a broadcasting program such as a radio broadcasting program, an editor selection (edit) list selected or edited by a editor or a publisher, an amateur selection (edit) song list selected (edited) by an amateur, and so on. These selection lists are obtained by the system control unit 19 (for example, execution of a Web browser software) through the network 4 from the information providing server 3. Further, the apparatus 1 may have a tuner to make the tuner obtain the list out of information, included in a broadcasting wave which is received by the tuner. The method of obtaining the list is not specifically limited.

In a case where a song is continuously selected by the above action or operation, the selection order of the plurality of songs is determined. Such the selection order is for example a track number order (record order) of songs registered in the play list, a track number order of songs registered in the play list or a broadcasting order broadcasted by radio broadcasting or the like. The selection order is reflection of cerebration, sensitivity, or the like.

Further, the songs selected by the above action or operation is applied with a unique (inherent) ID (identification information) with for example the system control unit 19. A timing of applying such the ID is when the song is designated by the above action or operation or selection list already produced is obtained (for example from the information providing server 3). Further, when the ID is applied, it is controlled such that a plurality of IDs are not given to an identical song, and an identical ID is not given to different songs as many as two or more, on the basis of song title, artist name and so on.

As such the ID given to the song is registered in the ID list, and the ID list is recorded for example in the HD.

FIG. 3(A) shows an example of content of ID list. In the example of FIG. 3(A), the ID and the song title are registered in correspondence with each other. By this, each of the songs and the ID corresponding thereto are associated.

Further, a selection order of the songs having the IDs is registered (listed) in the selection order list. Such the selection order list is recorded on for example the HD.

FIG. 3(B) shows an example of content of the selection order list. In the example of FIG. 3(B), the selection order is stipulated by the IDs given to the songs. The selection order of No. 1 shown in FIG. 3(B) is stipulated in an order of ID1→ID2→ID3→ID4, where arrow mark "→" schematically designates a direction of selection, and selection is not limited to such the arrow mark). For example, songs included in a CD album are registered by continuously reproducing in the order of track numbers (for example, aaaaaa→bbbbbb→cccccc→dddddd). Such the registration of the selection order to the selection list (listing) is completed in a case where for example a song is reproduced (automatic reproduction), ejection of recording medium such as CD, and turning-off of power source of apparatus.

Further, "selection count" shown in FIG. 3(B) indicates how many times selection is carried out in a order corresponding thereto. For example, selections in the order of ID1→ID2→ID3→ID4 are five times in "No. 1" of FIG. 3(B).

Further, a selection order of "No. 2" in FIG. 3(B) is stipulated in an order of ID2→ID5→ID3. For example, this is registered by the user of the apparatus of continuously selecting songs by a predetermined operation of track number or the like of predetermined song. Registration (listing) of thus selected order into the selection order list is completed, for example, in a case of ejection of the recording medium such as CD, turning-off of power source apparatus, or the like.

Further, a selection order of "No. 3" in FIG. 3(B) is stipulated in an order of ID2→ID1→ID7→ID9. For example, in a case where a song selection list (for example, it is registered in an order of bbbbbb→aaaaaa→gggggg→iiiiii) is obtained from the information providing server 3 (for example, obtained by a Web browser), the selection order is registered in the selection order list.

Information (information such that whether or not it is a play list of user, a radio selection (edit) list of which broadcasting program or the like) related to an origin of obtaining each of the selected order is registered in the selection order list in correspondence with each of the selection orders.

Figure 3:
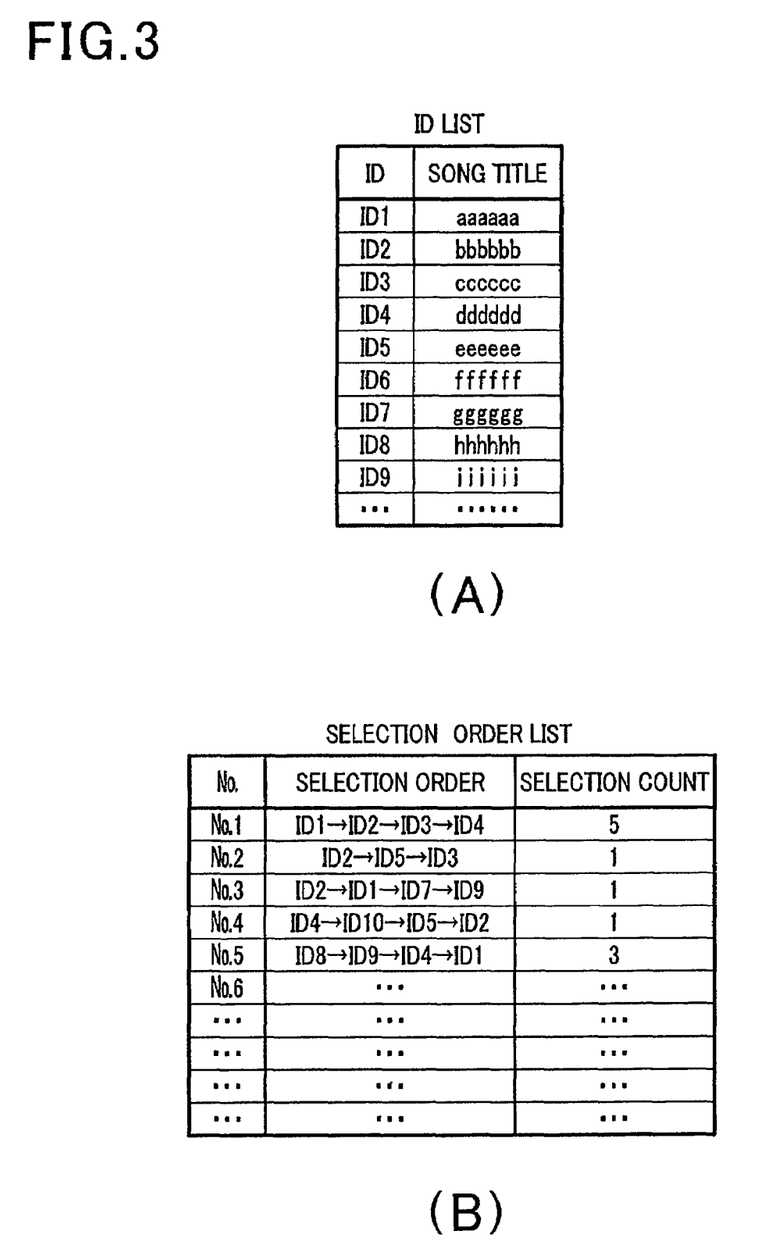

Further, in the above example, as songs are selected and selection lists are obtained, ID is attached by the system control unit 19. For example, it is also possible to obtain an ID list, which is listed as a song selection list including songs having unique ID respectively applied on a side of the broadcasting station or information server 3. In this case, since the IDs are applied at a plurality of places, there is provided an ID applying rule such that a plurality of IDs are prevented from being attached to an identical song, and simultaneously an identical ID is prevented from being attached to two or more different songs.

For example, when the system control unit 19 automatically reproduces songs, one or a plurality of selection candidate songs to be selected next to a predetermined song (for example a first song which is randomly selected) are extracted on the basis of selection order registered in the above selection order list. For example, when ID of the predetermined song is ID2 in FIG. 3(B), a song corresponding to the ID3 in the selection order "No. 1" and connected to the ID2, and a song corresponding to ID1 in the selection order "No. 3" are respectively extracted as selection candidate songs.

Further, for example, a selection candidate song related to the predetermined song is determined out of selection candidate songs thus selected as a song selected next to the predetermined song by priority. The selection candidate song related to the predetermined song is, for example, determined on the basis of priority of chain.

The priority of chain is determined using, for example, the above-mentioned selection number, quality of selection order, and relationship between the predetermined song and the song selected next to this, as parameters.

For example, the priority of chain is enhanced as the selection number increases, the priority of chain is enhanced as quality of the selection order becomes higher, and the priority of chain is enhanced as the relationship becomes more relevant.

In an example of FIG. 3(B), "selection number" of the selection order of "No. 1" is five times, being the maximum value. As a result, the selection candidate songs corresponding to ID3 are determined as a song selected next to the predetermined song.

Further, the quality of selection order is highest in, for example, a selection order by a user's designating operation and a playlist produced by the user. Sequentially, a selection order in artist song selection (edit) list, a selection order in radio song selection (edit) list, a selection order in editor song selection (edit) list, and a selection order in amateur song selection (edit) list are set up to thereby gradually lower their qualities. Further, when there is a selection order in a plurality of radio selection (edit) song list obtained from a plurality of broadcasting programs, it may be constituted such that information related to evaluation of each list is obtained and quality of the selection order is set up (for example, quality of selection order in the radio selection (edit) list related to a specific program or a specific disk jockey is set up high).

Further, the relationship between the predetermined song and the song to be selected is, for example, set up to be more relevant in a case where the two songs are from an identical broadcasting program, an identical artist, an identical genre, an identical date of selection, and similar song characteristic amount.

A process of determining the song selected next to the predetermined song is repeatedly carried out.

Figure 4:
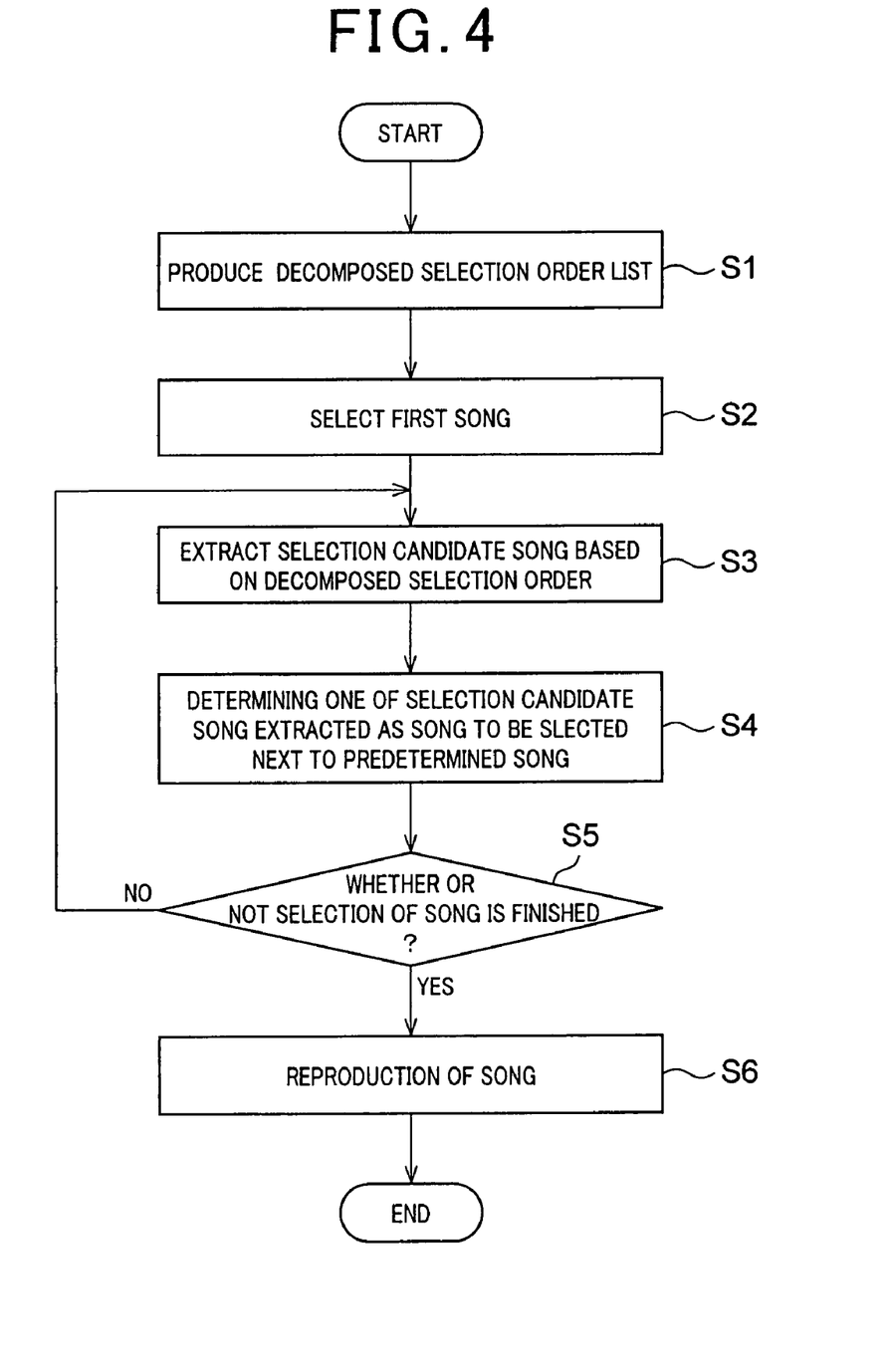
FIG. 4 A flow chart showing process in system control unit 19 in a case where song is continuously selected and reproduced.

Next in reference of FIG. 4, a process of the system control unit 19 in a case where songs are continuously selected and reproduced in use of the ID list and selection order list. In the following, it will be explained such that the above-mentioned ID list and the selection order list are already produced and recorded on an HD.

FIG. 4 is a flow chart for showing a process of the system control unit 19 in a case where songs are continuously selected and reproduced.

The process shown in FIG. 4 is initiated for example when a user utters automatic reproduction request or the user pushes down an operation button indicative of the automatic reproduction request. First, data such as an ID list recorded on an HD, a selection order list, and a song list are read out by the system control unit 19.

Then the system control unit 19 breaks down the selection order of connecting songs as many as a predetermined number (e.g. three) into a plurality of pieces from the selection order registered in the selection order list, and produces a selection order list where a plurality of selection orders thus broken down (hereinafter referred to as broken-down selection order) are registered (Step 1).

Figure 5:
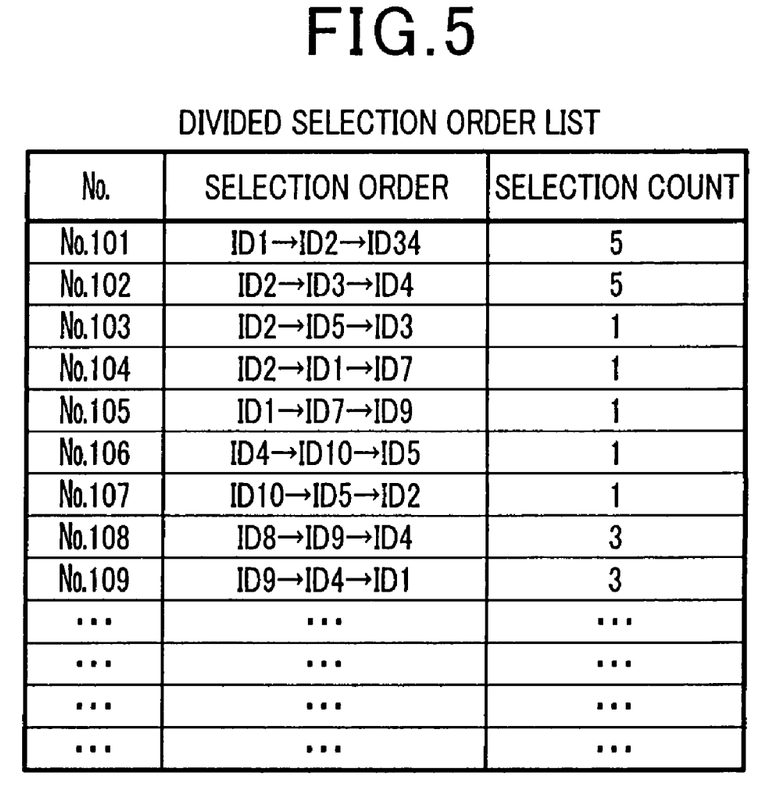
FIG. 5 A figure showing an example of disassembly selection order list.

FIG. 5 is an example of the broken-down selection list thus produced.

In the example of FIG. 5, for example, a broken-down order connecting three songs (indicated by IDs) like chain is shown. For example, a broken-down order (ID1→ID2→ID3) of "No. 101" and a broken-down order (ID2→ID3→ID4) of "No. 102" are produced by breaking down the selection order (ID1→ID2→ID3→ID4) of "No. 1" shown in FIG. 3(B) on the basis of the selection order. Further, the broken-down selection order respectively correspond to "selection count", which depends on selection count of the selection order used as the base. In use of such the broken-down selection order, it is possible to widen degree (variation) of song selection.

Further, according to the broken-down selection list shown in FIG. 5, the example that the lump having the three IDs connected in chain is registered plural times is shown. However, the invention is not limited thereto, and the lump may have four IDs connected in chain. Or it may be one lump having two IDs in chain. Further, the broken-down section order list may be produced in advance and recorded in an HD.

Next, the system control unit 19 selects a (first) song corresponding to the ID by randomly selecting one ID out of for example an ID list. Meanwhile, the first song selected may be one out of songs registered in the ID list and desired by the user.

Next, the system control unit 19 extracts the selection candidate song on the basis of the broken-down selection order starting from the first song in the plurality of broken-down selection order, which is registered in the broken-down selection order list. For example, provided that the first song ID is ID1, the broken-down selection order starting from the first song correspond to two broken-down selection orders "No. 101" and "No. 105". Each song corresponding to ID2 and ID7 connected to the song of ID1 is extracted as the selection candidate song on the basis of two broken-down selection order.

Next, the system control unit 19 determines one selection candidate song related to the first song thus selected, for example the selection candidate song having the highest priority, as the song to be selected next (Step S4). The song thus determined (namely, selected) is registered in for example a new play list.

For example, in the example shown in FIG. 5, in a case where selected candidate songs corresponding to ID2 and ID7 are extracted, selection counts respectively corresponding to the selection songs are compared. The selection candidate song (song corresponding to ID2 in this case) having the highest priority of chain (the most firm connection) is determined as a song to be selected next.

Or the selection candidate song included in the selection order (for example, the selection order in the play list produced by a user) in a play list having the highest quality out of the selected candidate songs extracted is determined as the song to be selected next. In a case where the selection order in the play list does not exist, the selection candidate song included in the selection order in the artist selection (edit) list is determined.

The selection candidate song having high relevancy (for example, an identical broadcasting program, an identical artist, an identical musical mood, or a similar song characteristic amount) with the first song out of the select candidate songs thus selected is determined as song to be selected next.

Further, discrimination whether or not it is an identical broadcasting program is, for example, carried out on the basis of information indicative of the broadcasting program corresponding to selection order, which is registered in the selection order list (discrimination may be done whether or not it is in an identical selection order). Further, Discrimination whether or not the identical broadcasting program is carried out on the basis of the information indicative of the broadcasting program corresponding to the selection order registered in for example the selection order list (discrimination may be carried out whether or not it is within an identical selection order). Further, discrimination whether or not artists or musical moods are the same is carried out on the basis of artists names or musical moods respectively of the songs which are registered in the song lists. Further, discrimination of whether or not the song characteristic amounts are approximate is carried out based on the song characteristic amount respectively of the songs registered in the song list. For example, in a case where a difference of the song characteristic amounts of the songs is within a predetermined range, it is judged to be approximate.

Further, a value of weight may be set up in parameters of priority in chain (i.e. the selection count, the quality of selection order, the relevancy and so on), wherein the value of weight may be arbitrarily set up. It may be possible to narrow down one selection candidate song from the plurality of selection candidate songs thus extracted in an order from larger weight value to smaller one. For example, provided that the weight value decreases in an order of from the selection count, the quality of selection order, and the relevancy, first a selection candidate song having the largest selection counts is determined out of the plurality of selection candidate songs thus extracted. In a case where it is not narrowed down to one selection candidate song, next a selection candidate song included in a selection order having the highest quality is determined. In a case where it is not still narrowed down to one selection candidate song, further a selection candidate song having the highest relevancy is determined.

In a case where the selection candidate song thus extracted is as many as one, the selection candidate song is determined as the song to be selected next.

Next the system control unit 19 determines whether or not selection of song is completed in Step S5. In a case where it is not completed (for example, it does not reach the maximum selection song count set up by a user or the like) along N in Step S5, the process returns to Step S3, and the selection candidate song is extracted on a basis of broken-down selection order starting from a song determined in the above Step S4 in a plurality of broken-down selection order registered in the broken-down selection order list. For example, when a song ID determined in Step S4 is ID2, the broken-down selection order starting from a song corresponding to ID2 corresponds to "No. 102", "No. 103" and "No. 104" in an example shown in FIG. 5. For example, the songs corresponding to ID3, ID5 and ID1, which are connected to the song of ID2, are extracted as the selection candidate song.

Then the system control unit 19, as described above, preferentially determines one selection candidate song related to a song determined in the above Step S4 out of the selection candidate songs thus selected, and registers the song in the play list. Thus the process is repeatedly carried out until it is determined that selection of the song is completed in Step S5, wherein number of songs continuously selected increases.

Then in a case where selection of song ends along Y in Step S5, the system control unit 19 carries out reproduction process of reproducing songs registered in the play list in the process, i.e. songs continuously selected by turns (Step S6). Further, the songs are not reproduced in Step S6 after the plurality of songs are continuously selected. It may be constituted such that the reproduction process is carried out at every selection of songs (namely, at every determination of songs to be selected in Step S4).

As described above, according to the above embodiment, since the selection candidate song selected next to the predetermined song is extracted on the basis of the selection order of the plurality of songs previously selected, and one of the selection candidate songs thus extracted is determined as a song selected next to the predetermined song in continuously selecting the songs. Therefore, it becomes possible to continuously select songs which reflect cerebration and sensitivity of human thereby enabling more easy process of selecting songs in a manner natural (humanly) for human without using a complicated algorism of such as artificial intelligence.

Further, for example, it is possible to dissolve inconvenience that a song which a user does not wish to listen is not selected.

Further, when there are a plurality of selection candidate songs, the song may be randomly selected in response to priority. In this case, it is also possible to select a song in a manner close to cerebration and sensitivity of human at a time of automatically reproducing past selection history.

Furthermore, in the above embodiment, since priority of chain is used and the selection candidate song having the highest priority (firmest connection) of chain is determined as a song to be selected next, it is possible to realize continuous selection of songs in a manner closer to cerebration and sensitivity of human.

In the above embodiment, it is described about the case where the selection order list is produced with respect to every ID lists. However, it is possible to constitute such that the selection candidate is extracted from the plurality of ID lists and the plurality of selection order lists, and the songs are selected based on the priority of chain similar to the above embodiment.

Further, in the above embodiment, although the selection counts, quality of selection order, and relevancy are applied as the example of parameter determining priority of chain, the present invention is not limited thereto and various matters such as season, place, hit chart, biological information, vehicle information, and traffic snarl-up information. For example, among the plurality of selection candidate songs, a selection candidate song matching that season (which is determined with the system control unit 19 by time of day) may be selected. Or, the selection candidate song positioning the uppermost of the hit chart at that time may be selected out of the plurality of selection candidate songs. Or, in a case where the present invention is applied to an on-board audio equipment to be equipped in a car, it is possible to constitute such that biological information is obtained with a sensor for obtaining the biological information such as ventricular rate to thereby select a selection candidate song matching, for example, excitation and quietness degrees of a driver which are judged using the biological information. For example, in a case where the excitation degree is high (high ventricular rate), a healing song may be selected, and in a case where the quietness degree is high (low ventricular rate), a hot song may be selected. Or, the vehicle information (e.g. vehicle speed) and traffic snarl-up information (e.g. traffic snarl-up information from VICS) may be obtained from the system control unit 19, and the selection candidate song matching, for example, the vehicle speed and traffic snarl-up may be selected. (For example, in a case where the vehicle speed is high, hot songs; and in a case of traffic snarl-up, healing songs.)

Further, in the above embodiment, the case where the program information according to the present invention is described. However, it is not limited to the present invention and it is possible to apply the present invention to contents such as image (video).

Further, in the above embodiment, the case where the present invention is applied to the information record and reproduction apparatus is described. However, the present invention is not limited thereto. It is also possible to apply the present invention to, for example, a portable information record and reproduce apparatus such as portable player, a portable handy phone, a PDA, and a personal computer.

Further, the present invention is not limited to the above embodiment. The above embodiment is an example and has a structure substantially similar to technical idea described in claims of the present invention. Anything having functions and effects similar to the embodiment are incorporated in a technical scope of the present invention.

Further, the entire disclosure of Japanese Patent Application Serial No. 2005-41826 filed on Feb. 18, 2005 including specification, claims, drawings and summary are incorporated herein by reference in its entirety.

The invention claimed is:

1. A selection method of program information in an information selection apparatus for selecting an arbitrary program information piece out of a plurality of program information pieces, the method comprising:

decomposing a plurality of previous selection orders defining an order of program information pieces into a plurality of selection orders each having a predetermined number of program information pieces;

extracting a-one or more selection candidate program pieces to be selected after a predetermined information piece based on the plurality of selection orders starting from the predetermined program information piece in the plurality of selection orders;

setting up a weight value for the one or more selection candidate program pieces based on a set of one or more parameters of priority in chain; and determining, based on the weight value, one of the selection candidate program information pieces to be selected after the predetermined program information piece at a time of continuously selecting the program information piece to be selected next to after the predetermined program information.

2. The selection method according to claim 1, wherein a program information piece selected that is related to the predetermined program is preferentially determined as a program information piece after the selection candidate program information piece determined based on the weight value.

3. An information selection apparatus for continuously selecting an arbitrary program information piece out of a plurality of program information pieces, comprising:

a decomposition device for decomposing a plurality of previous selection orders defining an order of connecting program information pieces into a plurality of selection orders each having a predetermined number of program information pieces;

an extraction device for extracting a-one or more selection candidate program pieces to be selected next to after a predetermined information piece based on the plurality of selection orders selection order starting from the predetermined program information piece in the plurality of selection orders;

a setting device for setting up a weight value for the one or more selection candidate program pieces based on a set of one or more parameters of priority in chain; and a determination device for determining, based on the weight value, one of the selection candidates program information pieces thus selected as a program information piece to be selected next to after the predetermined program information piece at a time of continuously selecting one of the selection candidate program information pieces.

4. The information selection apparatus according to claim 3, further comprising:

a reproduction control device for reproducing the program information piece continuously selected with the information selection apparatus.

5. A selection process program stored on a recording medium causing a computer, which continuously selects an arbitrary program information piece out of the plurality of program information pieces, to decompose a plurality of previous selection orders defining an order of program information pieces into a plurality of selection orders each having a predetermined number of program information pieces;

to extract one or more selection candidate program pieces to be selected after a predetermined information piece based on the plurality of selection orders starting from the predetermined program information piece in the plurality of selection orders;

to set up a weight value for the one or more selection candidate program pieces based on a set of one or more parameters of priority in chain; and to determine, based on the weight value, one of the selection candidate information pieces to be selected after the predetermined program information piece at a time of the continuous selection.

6. A recording medium according to claim 5 having the selection process program recorded on it in a manner readable by a computer.

* * * * *